(12) United States Patent
Matze et al.

(10) Patent No.: US 8,731,897 B2
(45) Date of Patent: May 20, 2014

(54) TAPE EMULATING DISK BASED STORAGE SYSTEM AND METHOD WITH AUTOMATICALLY RESIZED EMULATED TAPE CAPACITY

(75) Inventors: John E. Matze, Poway, CA (US); Michael H. Reider, Escondido, CA (US); Kenneth David Geist, San Diego, CA (US); Daniel Morgan Davies, San Diego, CA (US)

(73) Assignee: Overland Storage, Inc., San Diego, CA (US)

( * ) Notice: Subject to any disclaimer, the term of this patent is extended or adjusted under 35 U.S.C. 154(b) by 37 days.

(21) Appl. No.: 12/796,882

(22) Filed: Jun. 9, 2010

(65) Prior Publication Data

US 2010/0250229 A1 Sep. 30, 2010

Related U.S. Application Data (63) Continuation of application No. 10/943,779, filed on Sep. 17, 2004, now Pat. No. 7,761,284.

(60) Provisional application No. 60/605,894, filed on Aug. 30, 2004, provisional application No. 60/605,890, filed on Aug. 31, 2004.

(51) Int. Cl.
*G06F 9/455* (2006.01)

(52) U.S. Cl.
USPC .......................................................... 703/24

(58) Field of Classification Search
None
See application file for complete search history.

(56) References Cited

U.S. PATENT DOCUMENTS

| | | | |
|---|---|---|---|
| 4,467,421 A | 8/1984 | White et al. | |
| 5,297,124 A * | 3/1994 | Plotkin et al. | 360/49 |
| 6,067,481 A | 5/2000 | Saliba et al. | |
| 6,070,224 A | 5/2000 | LeCrone et al. | |
| 6,088,764 A * | 7/2000 | Shyam et al. | 711/112 |
| 6,260,110 B1 | 7/2001 | LeCrone et al. | |
| 6,269,431 B1 * | 7/2001 | Dunham | 711/162 |
| 6,571,205 B1 | 5/2003 | Doucet et al. | |
| 6,816,941 B1 | 11/2004 | Carlson et al. | |
| 6,834,324 B1 * | 12/2004 | Wood | 711/111 |
| 7,219,043 B2 * | 5/2007 | Rebello et al. | 703/7 |
| 7,308,528 B2 | 12/2007 | Kitamura et al. | |
| 7,761,284 B2 | 7/2010 | Matze et al. | |
| 2002/0156974 A1 | 10/2002 | Ulrich et al. | |
| 2003/0070056 A1 | 4/2003 | Greco | |
| 2003/0093509 A1 | 5/2003 | Li et al. | |
| 2003/0149795 A1 | 8/2003 | Lamb et al. | |
| 2004/0030668 A1 | 2/2004 | Pawlowski et al. | |
| 2004/0034811 A1 | 2/2004 | Trimmer et al. | |
| 2004/0044842 A1 | 3/2004 | Trimmer et al. | |

(Continued)

OTHER PUBLICATIONS

Amendment for U.S. Appl. No. 10/943,779, dated Nov. 5, 2008.

(Continued)

*Primary Examiner* — David Silver
(74) *Attorney, Agent, or Firm* — Knobbe Martens Olson & Bear LLP (57) ABSTRACT

A data protection and storage system includes an array of disk drives for data storage. Data is received for storage on the disk drive via an interface that is configured to emulate a tape drive interface. A virtual tape data structure is created and stored on the disk drives. The allocated capacity of the virtual tape is dynamically and transparently alterable in response to data storage demand within the virtual tape.

5 Claims, 6 Drawing Sheets

(56) References Cited

U.S. PATENT DOCUMENTS

| | | |
|---|---|---|
| 2004/0068635 A1* | 4/2004 | Bjork et al. ............ 711/171 |
| 2004/0098244 A1 | 5/2004 | Dailey et al. |
| 2004/0111251 A1 | 6/2004 | Trimmer et al. |
| 2004/0153614 A1 | 8/2004 | Bitner et al. |
| 2005/0193235 A1* | 9/2005 | Sandorfi et al. ............ 714/6 |
| 2005/0198408 A1 | 9/2005 | Watanabe et al. |

OTHER PUBLICATIONS

Amendment for U.S. Appl. No. 10/943,779, dated Oct. 13, 2009.
European Office Action for 05 793 416.8, dated Apr. 14, 2008.
European Office Action for 05 793 416.8, dated Apr. 22, 2010.
International Search Report for PCT/US2005/029783, dated May 16, 2006.
Notice of Allowance and Fee(s) Due for U.S. Appl. No. 10/943,779, dated Mar. 9, 2010.
Office Action for U.S. Appl. No. 10/943,779, dated Aug. 6, 2008.
Office Action for U.S. Appl. No. 10/943,779, dated Feb. 4, 2009.
Office Action for U.S. Appl. No. 10/943,779, dated Jul. 14, 2009.
Request for Continued Examination for U.S. Appl. No. 10/943,779, dated May 4, 2009.
European Office Action for EP Patent Application No. 05793416.8, dated Feb. 29, 2012.

* cited by examiner

(PRIOR ART)

FIG. 3

(PRIOR ART)

TAPE EMULATING DISK BASED STORAGE SYSTEM AND METHOD WITH AUTOMATICALLY RESIZED EMULATED TAPE CAPACITY

CROSS REFERENCE TO RELATED APPLICATIONS

This application is a continuation of U.S. application Ser. No. 10/943,779 which claims priority under 35 U.S.C. 119(e) to U.S. Provisional Application Nos. 60/605,894 filed Aug. 30, 2004 and 60/605,890 filed on Aug. 31, 2004. These applications are hereby incorporated by reference in their entireties.

BACKGROUND OF THE INVENTION

1. Field of the Invention

This invention relates to systems and methods for storing electronic data and has applicability to enterprise data backup systems.

2. Description of the Related Art

Improving backup and restore performance is a continuing desire of enterprise data managers. In a typical computing environment, magnetic disk drives are used as the primary storage mechanism for active data, whereas magnetic tapes are used for data backup and archive. The magnetic disks provide rapid and reliable access to data, but they are perceived as being more expensive. In addition, since they are non-removable they are at risk of physical disasters. Magnetic tape storage is perceived as being less expensive, and because tape cartridges are removable, they can be moved to offsite locations to protect against physical disasters. Therefore, most backup software in use has been optimized for use with magnetic tape technology.

Reading and writing data on a tape requires that the reel be unwound until the desired location is found. Once in the appropriate location the read or write operation can begin. Because of the mechanical nature of this access, read and write operations are slow and often fail. In many situations, it would be beneficial to provide the random access speed and the reliability of a magnetic disk drive to backup systems while still allowing for the possibility of offsite storage. As a result, a new category of magnetic disk systems is becoming popular called virtual tape technology.

Virtual tape systems are magnetic disk systems that transparently emulate a tape drive or a tape library. They provide the same physical connections to a host, such as SCSI, Fibre Channel or Ethernet. This allows them connect in the same way as the tape systems they are replacing or augmenting. They also provide the same logical response to tape commands, which allows the same backup software to remain in use. The emulator must also be able to send the host computer expected tape-drive interrupt signals such as beginning-of-tape, end-of-tape, and inter-record-gap. In this case, such a system can plug right in to an existing tape based storage system without a need for the user to change his storage network or software environment.

Although such systems have been successful in the marketplace, the currently available devices still do not fully take advantage of the properties of disk storage in a way that provides maximum flexibility and usefulness.

SUMMARY OF THE INVENTION

In one embodiment, the invention comprises a data storage system comprising one or more disk drives, an interface configured to emulate a tape drive and to receive data for storage on the one or more disk drives using tape format data storage commands and emulated tape storage data formats. The system also comprises a storage controller configured to allocate a portion of the storage space on the one or more disk drives to a tape storage volume that receives data via the interface. The storage controller is further configured to automatically change the amount of storage space allocated to the tape storage volume in response to tape format data storage commands received via the interface.

In another embodiment, a method of data storage comprises emulating a magnetic tape using a portion of data storage capacity of one or more disk drives, defining an end of data sector value and an end of media sector value for the emulated magnetic tape, and increasing the end of media sector value if the end of data sector exceeds a selected value.

DETAILED DESCRIPTION OF THE PREFERRED EMBODIMENT

Preferred embodiments of the present invention will now be described with reference to the accompanying Figures, wherein like numerals refer to like elements throughout. The terminology used in the description presented herein is intended to be interpreted in its broadest reasonable manner, even though it is being utilized in conjunction with a detailed description of certain specific preferred embodiments of the present invention. This is further emphasized below with respect to some particular terms used herein. Any terminology intended to be interpreted by the reader in any restricted manner will be overtly and specifically defined as such in this specification.

Figure 1:
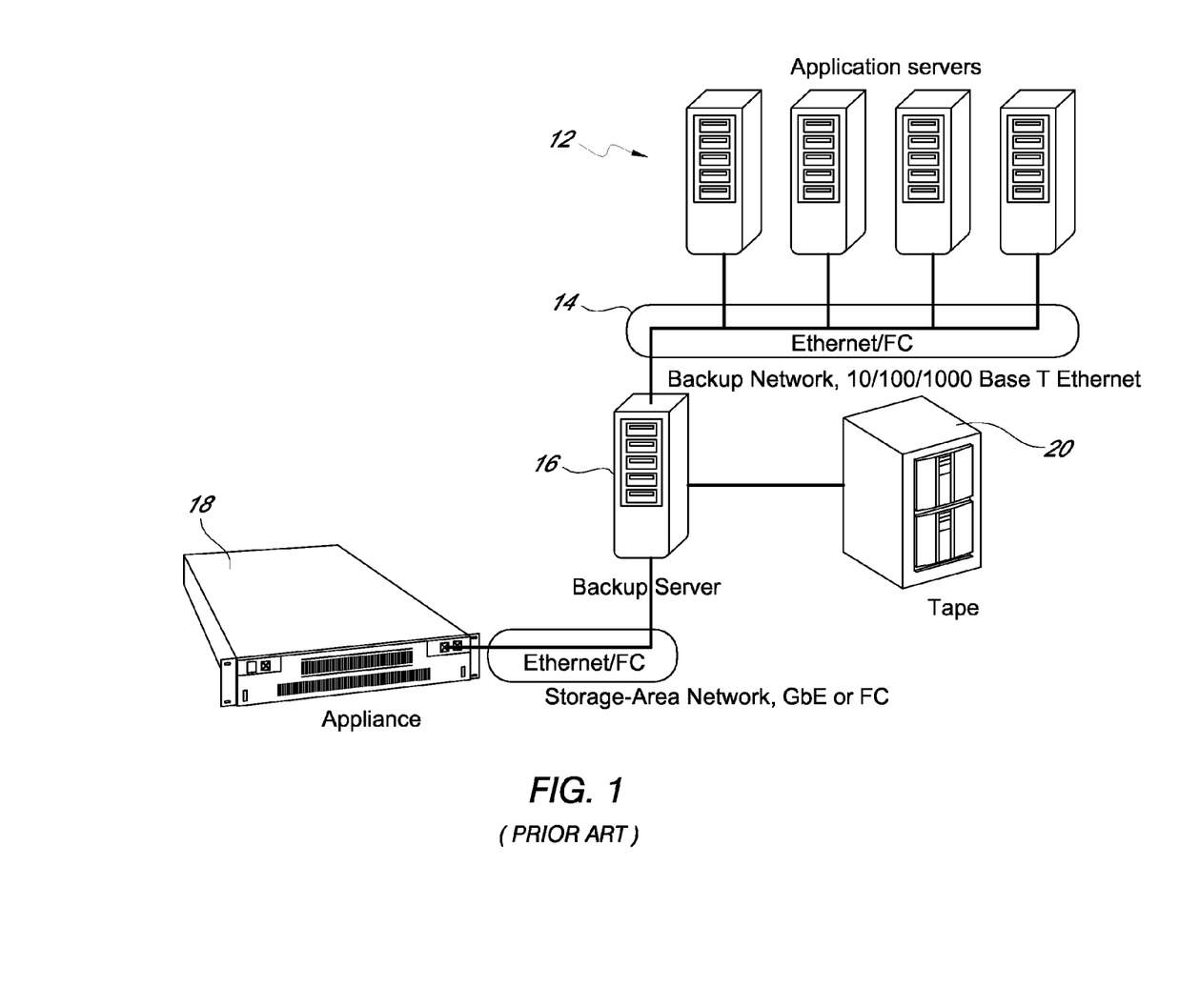
FIG. 1 is a schematic of one embodiment of a data backup system in which the invention may advantageously be used.

FIG. 1 illustrates one example of a commercially available hard disk based appliance with tape emulation features that can be used in a data protection environment. In this system, application servers 12 are connected to each other and to a backup server 16 over a network 14. The backup server 16 is connected to a tape drive or tape library 20, as well as another appliance 18 that contains one or more disk drives for data storage. In operation, the backup server receives data to be backed up from application servers 12, and routes that data to the appliance 18 that contains hard disk based storage. Later, that data may be moved by the backup server 16 from the appliance 18 to one or more tapes using the tape system 20. This system design helps speed up data backup by allowing fast initial backups to disk on the disk appliance 18, and taking the slower tape backup process off the application server network 14. It will be appreciated that the hardware components, functionality, and software present in the backup server 16, disk appliance 18, and tape drive/library can be combined and/or separated in various ways. For example, the disks of appliance 18 can be located in a separate device. As another example, the tape drive/library hardware and functions can be integral with the disk appliance 18 rather than provided as a separate unit.

As described above, the appliance 18 can be configured to interact with the backup server 16 in exactly the same manner and format of communication as the tape drive/library 20. In this way, software on the backup server 16 that is configured to communicate and store data using tape commands and tape data formats can utilize the disk based appliance 18 without modification. Speed is still improved, however, because tape commands such as moving to a desired block or writing data to tape can be accomplished on disk with the virtual tape much faster than a physical tape cartridge in a physical tape drive.

Figure 2:
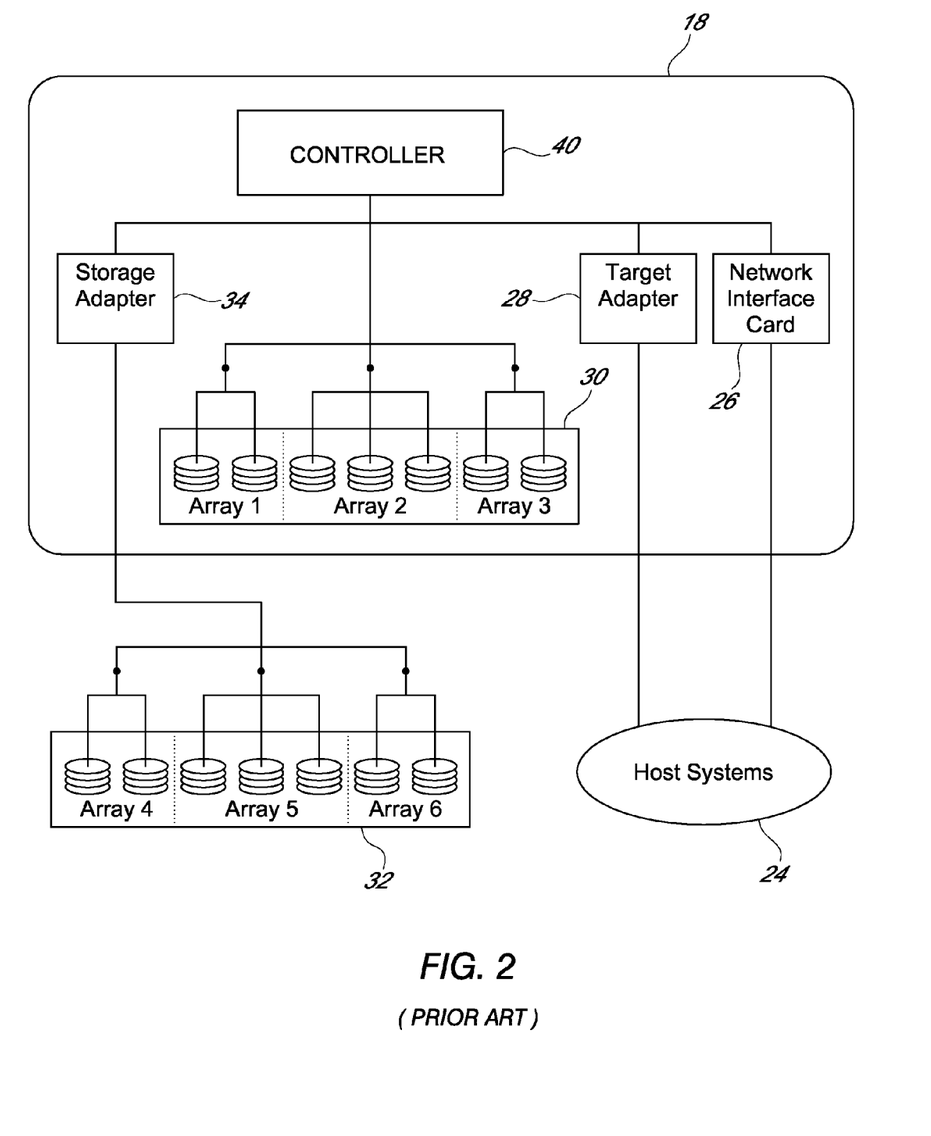
FIG. 2 is an illustration of one embodiment of the backup appliance of FIG. 1.

FIG. 2 illustrates some of the internal hardware components of one embodiment of the appliance 18 of FIG. 1. The appliance 18 connects to host systems 24 (which may, for example, include a backup server 16 as shown in FIG. 1) via one or more of a network interface card 26 or target adapter card 28. The network interface card 26 is typically an Ethernet card, and the target adapter card 28 is typically configured as a Fibre Channel or SCSI interface as is well known in the art, but it will be appreciated that any data communication interface or protocol could be used.

The appliance 18 may also include an internal disk drive array 30, and may alternatively or additionally connect to an external disk drive array 32 through a storage adapter 34 which may, for example, be configured as a Fibre Channel or SCSI interface.

The operation of the system is controlled by a storage controller 40 that defines how the appliance communicates with the host systems 24 and how data received from the host systems 24 is stored on the drive arrays 30, 32. In advantageous embodiments, the storage controller configures the appliance to present a set of "virtual" storage devices to the host systems 24 that are different in number, size, and type than the actual physical set of disk drives (e.g. eight 250 GB SATA hard drives) present in the appliance 18 drive array(s) 30, 32. This is illustrated in more detail in FIG. 3. Referring now to this Figure, the present invention may advantageously be implemented in a storage appliance incorporating a virtualization layer that establishes the externally presented characteristics of the storage appliance.

Figure 3:
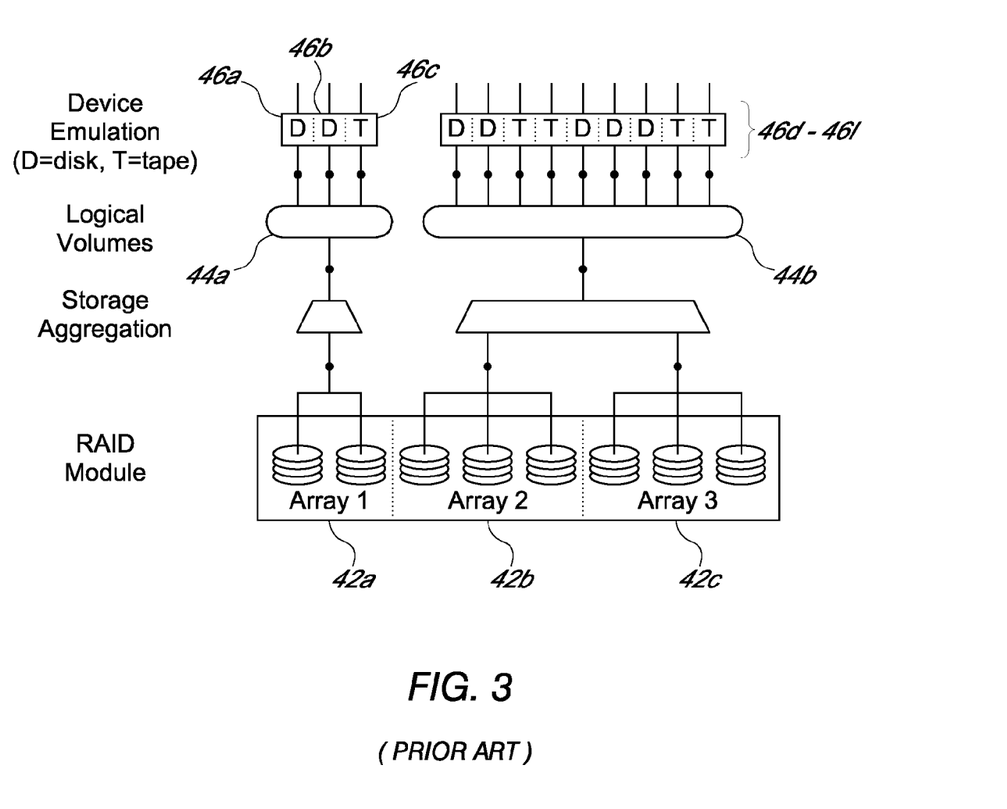
FIG. 3 is a functional block diagram of one embodiment of the backup appliance of FIGS. 1 and 2.

The physical set of disk targets form one or more RAID modules 42a, 42b, 42c. As described above, each RAID module could be internal or external to the storage appliance 18. These disk array targets are grouped together, typically corresponding to subsets with the same level of redundancy, and the storage within each group may be aggregated to form a single virtual storage repository, referred to as a volume group 44a, 44b. These volume groups can then be partitioned into virtual volumes that are presented externally as storage targets 46a-46l, also referred to as logical units. The logical units can be created with any size up to the size of the corresponding volume group they are associated with, and after creation the size can be adjusted. Each logical unit can be configured to emulate a SCSI disk drive or a SCSI tape drive. These logical units can then be accessed using a variety of protocols. For illustrative purposes, we will consider the case where a block protocol such as iSCSI, SCSI or FC is used to access a logical unit configured to simulate a tape drive.

Due to the different access methods of tape and disk drives, storing data on disks that is originally received from a host using tape storage protocols poses some difficulties. Because tape is sequential access and disk is random access, some degree of translation is necessary. Furthermore, data on disks is stored in fixed length sectors or blocks, which are normally 512 or 1024 bytes in length. Data on a tape consists of a series of records (sometimes referred to as logical blocks) of fixed or variable length, sequentially recorded along the length of the tape. The records usually are sequentially numbered and are separated by inter-record gaps that mark the boundary between two adjacent blocks. Additionally, special patterns called "file marks" are used to mark the boundary between backup sets.

Figure 4:
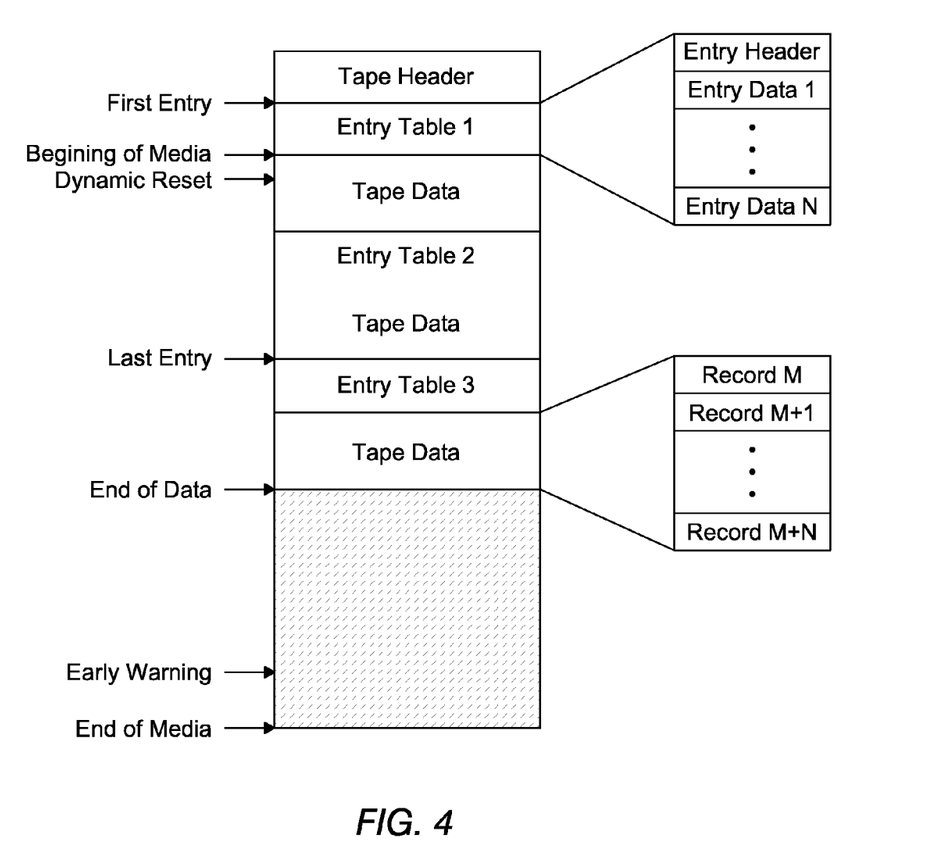
FIG. 4 is an illustration of the data format of a tape emulated on a disk drive storage device.

Thus, one of the functions a virtual tape system should perform is to establish a format on disk for representing the sequential nature and variable logical block length of tape. FIG. 4 illustrates a system and method for formatting variable size data records into a fixed block structure while taking advantage of the random access nature of disk drives. In especially advantageous embodiments, the format allows the virtual tape capacity to expand and contract dynamically in order provide for the efficient use of available system capacity. The implementation described in this document is for the emulation of a tape drive with a single cartridge, but the implementation is readily extended to the emulation of a tape library with multiple drives and multiple cartridges. We begin by defining the physical layout of the data, and then we will describe the method for dynamically changing the cartridge capacity.

Writing data to a tape usually occurs in one of three modes. Overwrite mode indicates that writing will start at the beginning of tape and any information currently on the tape is considered to be deleted. Overwrite mode can be used for a brand new tape or a used tape that contains data that can be overwritten. Append mode indicates that writing will begin at the end of the data that has been previously written. Thus, the existing data on the tape will be preserved and will remain accessible. Update mode indicates that writing will occur somewhere in the middle of the existing data. All existing data that comes after the initial writing point is considered to be deleted and will no longer be accessible. Any data that comes before the writing point will be preserved and will remain accessible.

Referring now to FIGS. 3 and 4, in one advantageous implementation of the invention, a virtual tape volume corresponding to a logical unit (e.g. the logical unit 46c of FIG. 3) is initially defined by a user of the appliance 18. This virtual tape volume has a particular user selected data storage size. The selected size corresponds to a number of 512 byte hard disk sectors on the hard drive array 42a of FIG. 3 which are "virtually" available for data storage via the virtual tape interface 46c. The set of "virtually available" hard disk sectors, along with a few additional sectors storing some format information, form an emulated tape on the hard disk media. In FIG. 4, the top of the diagram corresponds to the first 512 byte sector on a disk used to form this virtual tape, and the bottom of the diagram corresponds to the last virtually available 512 byte sector on the disk allocated for this virtual tape. It will be appreciated that the fixed length "sectors" that form the emulated tape may correspond to a set of physical disk sectors on a hard disk drive, but the actual disk sectors on which the data is physically stored need not, and generally will not, correspond to a contiguous and sequential set of sectors in a hard disk drive. It will thus be appreciated that the virtually available sectors may correspond to logical sectors which are mapped using well known techniques onto physical disk drive storage sectors.

This first sector(s) of the virtual tape are used to store a tape header. This contains some identification information and high level parameters describing the layout of the data of the virtual tape. The next region on the disk is the first entry table. The entry table contains information for keeping track of the variable length data records that have been stored on the tape. The entry table contains space for up to N data entries corresponding to N variable length data records that will be stored in the associated data area. The next region is the first data area. This is associated with the first entry table and is where variable length data records will be stored contiguously. The entry table is limited in size in order to reduce the overhead. If more than N records are written, an additional entry table is appended to the end of the data area. In this way, as data records are written to tape multiple entry tables may be allocated, each having an associated data area that immediately follows.

The tape header contains identification information and high level parameters describing the layout of the data. This structure is defined below:

| Field Type | Name | Description |
| --- | --- | --- |
| CHAR | SIGNATURE[ 32 ] ; | // ONLY MODIFY AT OPEN |
| BLOCK | TOTALBLOCKS ; | // TOTAL RECORDS WRITTEN |
| SECTOR | SECTORBOM ; | // BEGINNING OF MEDIA SECTOR |
| SECTOR | SECTOREOM ; | // END OF MEDIA SECTOR |
| SECTOR | SECTOREOD ; | // END OF DATA SECTOR |
| SECTOR | SECTOREW ; | // EARLY WARNING SECTOR |
| SECTOR | LASTENTRY ; | // LAST ENTRY TABLE SECTOR |
| UNSIGNED LONG | DRIVETYPE ; | |
| UINT64_T | FLAGS ; | // EMULATION MODE FLAGS |
| UNSIGNED LONG | CEILINGGB ; | // MAX DYNAMIC TAPE CAPACITY |

The Signature member is a pattern used to determine if a valid header has been written. The TotalBlocks member is to keep track of the number of variable length data records (tape logical blocks) that have been written. The SectorBOM member is the sector corresponding to the beginning of the first data area. We refer to this location as the beginning of media (BOM) and it represents the first sector where user data may be stored. The SectorEOM member is the last available sector for the emulated tape. We refer to this location as the end of media (EOM) and it represents the last sector where user data may be stored. The SectorEOD member is the sector immediately following the end of the last data area. This sector represents the location where appending write operations will start and we refer to this sector as the end of data (EOD). The SectorEW member is the early warning sector. When the EOD moves beyond this point an early warning signal is generated to notify the backup software that there is not much space left on the virtual tape. When dynamic tape mode is selected, this behavior may be modified as described below with reference to FIGS. 5 and 6. The LastEntry member holds the sector at the beginning of the last entry table that has been allocated. It represents the current entry table that will be used for the next appending write. The DriveType member indicates the model of tape drive that will be emulated. The Flags member indicates the emulation mode to use. This enables the optional implementation of advanced features that take advantage of the random access nature of disk to provide capabilities that would be difficult or impossible with physical tape drives. For the current invention, this flag is used to specify the dynamic tape mode. The CeilingGB member specifies the maximum capacity that should be allocated to a dynamic virtual tape cartridge. Although not shown in the table above, the tape header could also include a tape identifier or serial number.

The entry tables form a bi-directional linked list. Thus, given any table as a starting point, all the other tables can easily be accessed. The entry table header contains the forward and reverse links, and information on the range of data records that are accessible using the given entry table. The entry table header is defined below:

| Field Type | Name | Description |
| --- | --- | --- |
| SECTOR | Previous ; | // previous entry table |
| SECTOR | Next ; | // next entry table |
| BLOCK | Start ; | // first block number |

The Previous member is the sector where the previous table in the list begins. The Next member is the sector where the next table in list begins. The Start member is the record number corresponding to the first entry in the table. If each table hold N entries, the first table will have Start equal to 1, the second table will have Start equal to N+1, the third table will have Start equal to 2N+1, and so on. Each entry table will contain a series of entry data structures that give information on how to access each corresponding data record. The entry data structure may be defined below:

| Field Type | Name | Description |
| --- | --- | --- |
| SECTOR | Sector ; | // Location of data record |
| unsigned char | Size[ 3 ] ; | // Size of data record |
| unsigned char | Flag ; | |

The Sector member is the sector corresponding to the beginning of the data record. The Size member is the size of the data record in bytes. The Flag member gives additional information about the contents of the record. It can be used to indicate special records such as file marks or it could indicate format choices such as whether the record has been compressed or not.

The parameters described above represent information that would be stored on a tape cartridge. Now we go on to discuss the information that relates to the tape drive. Virtual tape drive parameters will generally not be stored on the drive arrays in the appliance, but may be stored in non-volatile memory in the storage controller 40. A data structure that describes the tape drive is shown below:

| Field Type | Name | Description |
| --- | --- | --- |
| unsigned | Loaded ; | // tape cartridge loaded? |
| TAPE_HEADER | Header ; | // tape header |
| BLOCK | Block ; | // current block number |
| SECTOR | Sector ; | // current sector location |
| TAPE_ENTRY | *EntryBuffer ; | // current entry table |
| SECTOR | Entry ; | // current entry table sector |
| unsigned | Dirty ; | // header needs to be written? |
| unsigned | DriveLocked ; | // prevent media removal? |
| unsigned | EndOfMedia ; | // reached end of media? |
| unsigned | EarlyWarning ; | // reached early warning point? |
| unsigned | EndOfData ; | // at end of data? |
| unsigned | FileMarkSet ; | // is current block a file mark? |
| char | Sn[TAPE_SN_LEN] ; | // drive serial number |
| MODE_DATA | Mode ; | // drive specific mode parameters |

The Loaded member indicates whether a tape cartridge is loaded in the drive. If a cartridge is loaded, the Header member will contain the header information read from the cartridge. The Block member is the current block number that will be used for read and write commands. The Sector member is the current sector location. This corresponds to the beginning of the data record referenced by the current block number. It is the location where the next read or write will take place if no seek commands are given beforehand. The EntryBuffer member is a copy of the current entry table, which usually contains the entry corresponding to the current block. The Entry member is the sector location of the table loaded in EntryBuffer. The Dirty member indicates that the tape header has been updated but that the updates have not been written to the tape image. The DriveLocked member indicates whether tape cartridge removal is allowed. The EndofMedia member indicates if the current sector is at or beyond the end of media location. The EarlyWarning member indicates if the current sector is at or beyond the early warning location. The EndofData member indicates if the current sector is at end of data location. The FileMarkSet member indicates if the current block is a file mark. The SN member is the serial number of the drive. The Mode member contains drive specific parameters related to the current state of the drive.

As an example of the operation of the virtual tape system, consider the situation where we load a tape cartridge and perform an append write. When the cartridge is loaded, the header is read from the media and stored in the tape drive structure and the cartridge is initialized to the rewound state. To prepare for an append, the backup software will request a seek to just beyond the last logical block. To achieve this, the current block number is set to one plus the total number of blocks, which is stored in the tape header. Next, the current sector is set to the end of data, which is also in the tape header. Then the current entry table is loaded from the location specified by last entry in the header and the entry member is set to this location. When the write begins, an entry will be allocated for use. If no entry location is available in the current table, which is specified by the last entry table parameter in the header, a new entry table is allocated. If a new table is required, its location is the current end of data location, and the end of data will be incremented by the size of the entry table. The newly allocated entry will set its location member to the current end of data and the size and flag members will be set. Then the data record will be written and the end of data location will be incremented by the size of the data record. Optionally, the record could be compressed and then the size of the record would be its size after compression since that is what gets written to media. Finally, the current block number is incremented and the current sector location is set to the current end of data.

As another example, consider the situation where we wish to read a designated data record that is somewhere in the middle of the data on the cartridge. The current block number is set to the record number we wish to read. Next, we locate the entry table containing the entry that will allow us to read the desired record. As a first step, we check to see if the specified block number has an entry in the current entry table. To accomplish this we look at the Start member in the current entry table. If the specified block number is greater than or equal to Start and less than Start plus the number of entries the table can hold, then the current table has the desired entry. If the specified block number is less than Start, then we use the Previous member in the current entry table to load the previous entry table into memory and this becomes the current entry table. Then we perform our check again to see if the entry is the current table. If not we keep going to previous tables until we have located the correct table. If the specified block number is greater than or equal to Start plus the number of entries the table can hold, then we use the Next member to load the next entry table into memory. We perform our check again to determine whether we have the correct table, and if not we keep moving forward until we have loaded the correct table. Once we have the correct table, we can use the entry to get the location of the data record and then begin reading. The flag in the entry data will tell us whether we have to decompress or not.

Figure 5:
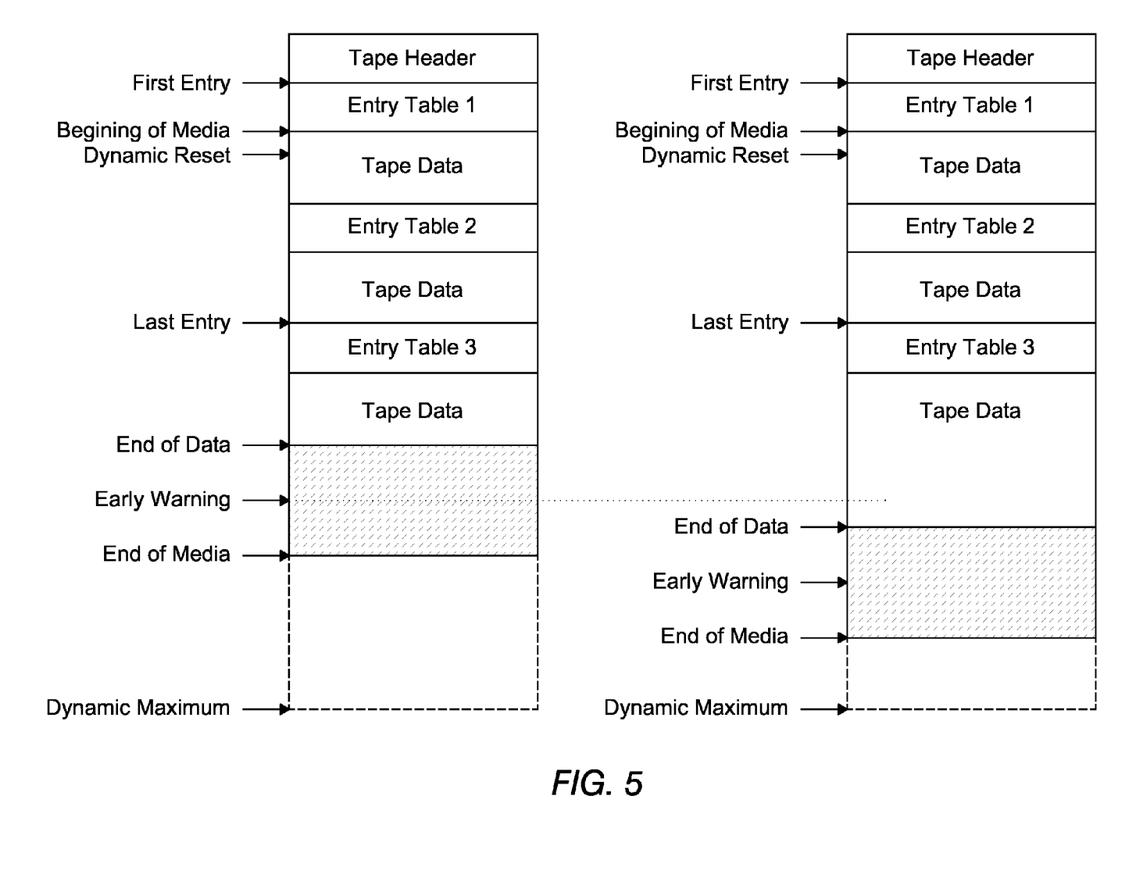
FIG. 5 is an illustration of dynamic tape capacity expansion.
Figure 6:
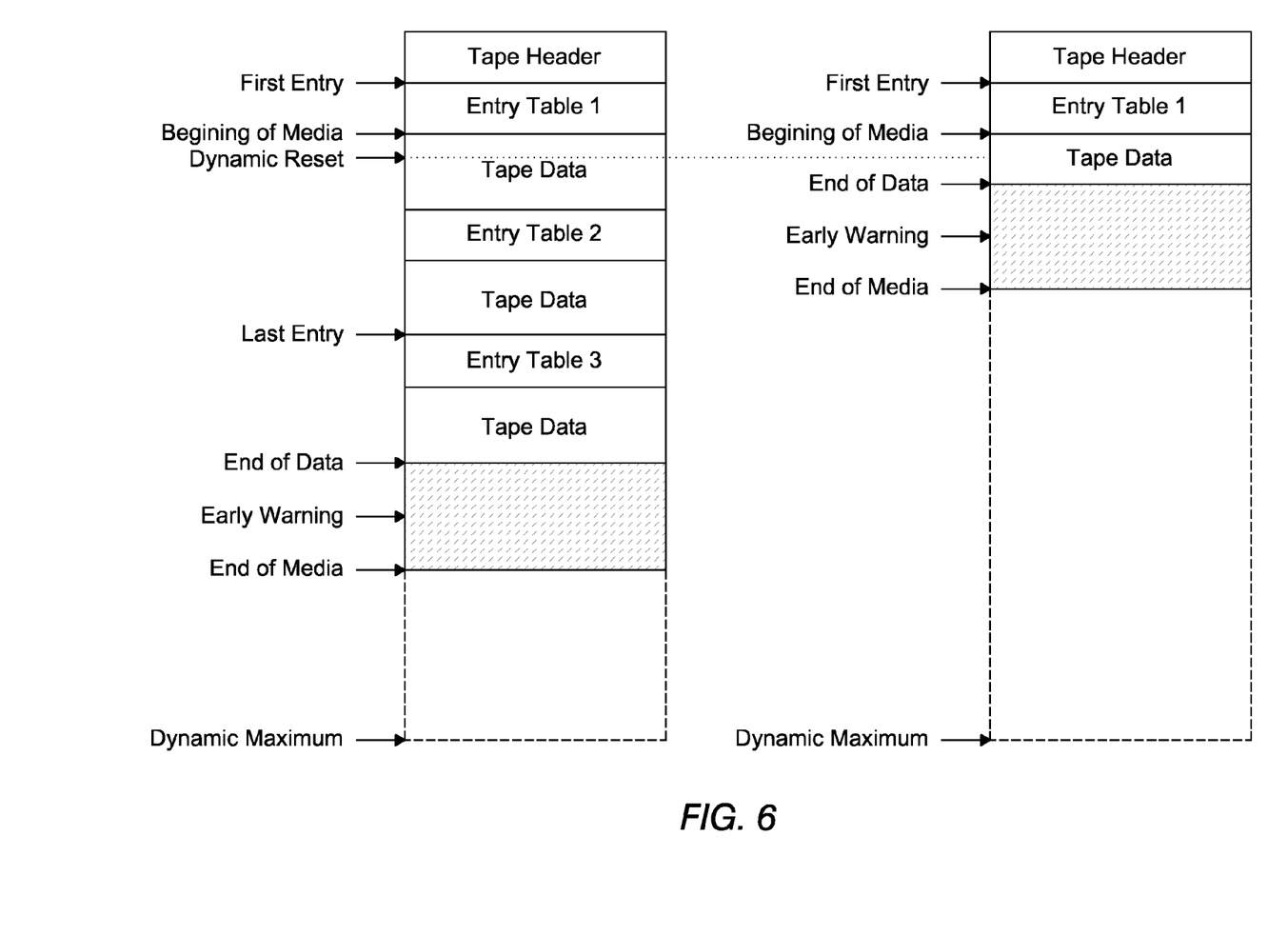
FIG. 6 is an illustration of dynamic tape capacity reduction.

Moving now to FIGS. 5 and 6, when a logical unit is designated as a dynamic tape target, a minimum amount of storage capacity may be allocated, such as 1 GB. At the time of creation, a maximum capacity may be assigned. If a maximum capacity is specified then the allocated capacity of the dynamic tape target will not be expanded above this limit. If no maximum is specified, the maximum is taken to be the size of the volume group from which it is defined. In practice, the maximum may not be achievable if there is not enough available capacity due to capacity allocated to other logical units formed from the volume group.

When the backup application mounts the dynamic tape, it appears as if it is a normal physical tape. During a write operation, expansion of the capacity for the dynamic tape target is possible. If the early warning sector is reached, the system will check to see if it can allocate an incremental storage amount such as 1G to the dynamic tape target. If the additional allocation would cause the total storage assigned to the dynamic tape target to exceed its maximum or if there is not enough available capacity in the volume group then the early warning signal is reported to the host. Otherwise, the additional capacity is allocated to the dynamic tape target and no early warning signal is reported. The end of media and early warning pointers are then moved down to indicate the extra capacity. This is illustrated in FIG. 5.

During a write operation it is also possible that the capacity allocated to the dynamic tape target could be reduced. The dynamic reset boundary is defined as the tape record number that represents a threshold for deciding if the entire tape is being overwritten. If a write operation occurs below the dynamic reset threshold, the dynamic tape capacity is reduced back down to the minimum allocation. The released storage is then added back to the storage pool for the corresponding volume group, and the end of media and early warning pointers are then moved up to indicate the reduced capacity. This is illustrated in FIG. 6.

Because of the dynamic nature of the capacity allocation, the total available system capacity will fluctuate possibly in an unpredictable manner. For the storage appliance, warnings can be enabled to indicate that capacity allocation is approaching the capacity limit. Warnings would be communicated to an administrator using automated electronic methods such a email, SNMP or some other management tool. Two percentage thresholds will be established. If the allocated capacity exceeds the lower percentage threshold, a normal message will be transmitted to the administrator. If the allocated capacity exceeds the upper percentage threshold, a high priority critical message will be transmitted to the administrator. Reasonable choices for the two thresholds are 70% and 90%.

The dynamic expansion and contraction can result in another complication if the host issues a mode sense query to the logical unit corresponding to a virtual dynamic tape, requesting a response indicating the total storage capacity of the tape volume. In one embodiment, the appliance is configured to return the dynamic tape volume's maximum possible size allocation (e.g. the CeilingGB value) if a ceiling has been specified by the user and if there is currently enough free unallocated space in the storage pool to expand the volume from its current size all the way to its dynamic maximum. Otherwise, the volume size value returned is the current allocated size plus the total amount of remaining free space in the storage pool.

The foregoing description details certain preferred embodiments of the present invention and describes the best mode contemplated. It will be appreciated, however, that no matter how detailed the foregoing appears in text, the invention can be practiced in many ways. As is also stated above, it should be noted that the use of particular terminology when describing certain features or aspects of the present invention should not be taken to imply that the broadest reasonable meaning of such terminology is not intended, or that the terminology is being re-defined herein to be restricted to including any specific characteristics of the features or aspects of the invention with which that terminology is associated. The scope of the present invention should therefore be construed in accordance with the appended Claims and any equivalents thereof.

What is claimed is:

1. A data storage device comprising:
   at least one hard disk drive having a storage capacity;
   a tape drive emulator;
   at least one emulated magnetic tape having a defined apparent storage capacity provided by at least some of the storage capacity of said hard disk drive;
   means for automatically changing the defined apparent storage capacity of said emulated magnetic tape during execution of write commands received by said tape drive emulator; and
   wherein defined apparent storage capacity comprises both unused for data storage portions of the defined apparent storage capacity and used portions of the defined apparent storage capacity wherein said means for automatically changing the apparent storage capacity of said emulated magnetic tape comprises a stored value indicating an end of data sector and an early warning sector, and a storage controller configured to compare said end of data sector and early warning sector, said means for automatically changing the apparent storage capacity configured to change the apparent storage capacity based on said comparing.

2. The data storage device of claim 1, wherein said emulated magnetic tape is defined by entries in a stored tape header file that includes values for a beginning of media sector and an end of media sector.

3. The data storage device of claim 2, wherein said tape header file additionally defines a value for an early warning sector.

4. A method of data storage comprising:
   emulating a magnetic tape using a portion of data storage capacity of one or more disk drives, wherein the portion of data storage capacity comprises an amount of data capacity;
   defining an end of data sector value that indicates a used portion of the amount of data capacity and an end of media sector value that indicates an unused for data storage portion and the used portion of the amount of data capacity for said emulated magnetic tape;
   increasing said end of data sector value during a write command; and
   increasing said end of media sector value if said end of data sector exceeds a selected value defining an early warning sector value;
   comparing said end of data sector value with said early warning sector value; and
   increasing both said early warning sector value and said end of media sector value if said end of data sector value equals or exceeds said warning sector value.

5. The method of data storage of claim 4, further comprising emulating a second magnetic tape using a second portion of data storage capacity of said one or more disk drives, wherein at least a portion of the first portion of data storage capacity and at least a portion of the second portion of data storage capacity are located on a single disk drive.

* * * * *